United States Patent [19]
Chi

[11] Patent Number: 5,751,580
[45] Date of Patent: May 12, 1998

[54] FUZZY LOGIC METHOD AND SYSTEM FOR ADJUSTMENT OF PRIORITY RATING OF WORK IN PROCESS IN A PRODUCTION LINE

[75] Inventor: Keh-Fei Chris Chi, Singapore, Singapore

[73] Assignee: Chartered Semiconductor Manufacturing, Ltd., Singapore, Singapore

[21] Appl. No.: 686,783

[22] Filed: Jul. 26, 1996

[51] Int. Cl.[6] .......................... G06F 19/00; G06G 7/6466
[52] U.S. Cl. ........................ 364/468.07; 364/468.02; 364/468.05; 364/468.06; 364/468.07
[58] Field of Search ............... 364/468.07, 468.04, 364/552, 468.05, 468.02, 468.08, 468.15, 148.01, 150, 151, 468.06, 468.16, 468.22, 468.17

[56] References Cited

U.S. PATENT DOCUMENTS

| | | | |
|---|---|---|---|
| 4,866,628 | 9/1989 | Natarajan | 364/468 |
| 5,216,612 | 6/1993 | Cornett et al. | 364/468 |
| 5,446,671 | 8/1995 | Weaver et al. | 364/468 |
| 5,467,285 | 11/1995 | Flinn et al. | 364/478 |
| 5,546,329 | 8/1996 | Kurtzberg et al. | 364/552 |
| 5,559,710 | 9/1996 | Shahraray et al. | 364/468.04 |
| 5,612,886 | 3/1997 | Weng | 364/468.07 |
| 5,623,413 | 4/1997 | Matheson et al. | 364/436 |

*Primary Examiner*—Reba I. Elmore
*Assistant Examiner*—Ramesh Patel
*Attorney, Agent, or Firm*—George O. Saile; Stephen B. Ackerman; Graham S. Jones

[57] ABSTRACT

In a manufacturing control system for computer control of work flow in an automatic manufacturing production line with a plurality of work stations at which the progress of work is monitored, priority ratings are assigned to each lot of WIP materials with the priority ratings ranging from low to high. The priority rating of a lot increases as a function of increasing queue time, and as a function of the difference comprising the expected date out minus commitment date. The priority rating is reset to a default value after the lot is run. The passage of WIP materials is clocked to measure depletion and accumulation of material at a work station with increases in priority rating as a function of the difference of target velocity minus actual velocity of work with an increase of one priority rating level as the cumulative value of the difference exceeds a predetermined percentage.

33 Claims, 7 Drawing Sheets

FUZZY LOGIC METHOD AND SYSTEM FOR ADJUSTMENT OF PRIORITY RATING OF WORK IN PROCESS IN A PRODUCTION LINE

BACKGROUND OF THE INVENTION

1. Field of the Invention

This invention relates to system and processes for the manufacture of integrated circuit chips and more particularly to such systems and processes incorporating automatic control of production in an integrated circuit manufacturing process.

2. Description of Related Art

When production decisions were required in job shop factories in the past, decisions made were carried out independently in an uncoordinated fashion at each and every work center in the factory. Individual managers made the decisions based on information available to them and the preexisting schedules set by planners or similar executives in the factory which decisions were based on management objectives. Such independent decisions varied as a function of the status of the lots of Work In Progress (WIP). The decisions were influenced by foreseeable and unforeseeable problems which arose at unpredictable times in the form of emergencies which had to solved on an ad hoc basis without an overall plan to deal with these situations. Thus, as a result of the unpredictable nature of the schedule of the manufacturing process the status of the quantity of WIP materials varies based upon the quantities of the lots of product to be released and the status of equipment and other vagaries of the manufacturing process.

The shop-floor dispatching of lots of work, i.e. choosing which lot to run, is always difficult to manage in a semiconductor wafer fabrication factory because of the complexity of the sequence of processes in the factory. For example, there are up to five hundred (500) steps in a process flow; there are multiple process flows; there are up to fifty (50) types of equipment with different capacities and the same type of equipment is reused, but with different recipes.

DIGITAL KANBAN SYSTEM

"Kanban" is a Japanese word for bamboo, segment. The "Kanban" token system for use in control of a manufacturing process was developed in Japan as a convenient means of controlling WIP materials on a production line. In the Kanban system, a production process is divided into several Kanbans (segments.) Each Kanban (segment) of the manufacturing line is given a predetermined number of tokens to be attached to a batch of WIP materials called a "lot". Upon completion of processing of a lot, the lot is accepted by a donwstream Kanban and as a result a token is "freed" to accept another lot from an upstream Kanban. When all of the available Kanban tokens are all tied up to respective lots, no additional lot is allowed to be enter into the Kanban from an upstream process step. This is called a Kanban gate and the gate is shut when there are no available tokens for accepting a lot from an upstream Kanban.

Using this method, the quantity of WIP materials present, at any given time, in each Kanban is thus regulated not to exceed an allowable quantity level equivalent to the number of tokens in that Kanban. The maximum quantity level of WIP materials in each Kanban, is determined by a factory level planner who seeks to maintain line balancing as well as maximum equipment utilization.

There are several disadvantages of previously available types of digital Kanban systems, which disadvantages are as follows:

1. They are negative systems, controlling what cannot be run (shutting off the gate), but not determining what to run (which lot has priority). That is to say, when the gate of a Kanban is shut off, because of lack of free tokens, all the lots within that Kanban are either involved in being processed, or the lots are stalled waiting for the next Kanban to free up tokens to receive the stalled WIP materials. Notice that the stalled WIP materials are within the Kanban where the work was completed instead of being within the Kanban ready to process the WIP materials.

2. Those digital Kanban systems value cycle time more than capacity, which is a narrow view of the objective of factory management. For example, equipment utilization is likely to be sacrificed to reduce cycle time because of the higher priority assigned thereto. That is an inefficient choice which may reduce production volume because of the probability that some equipment in the factory will be left idle whereas global analysis would suggest a better allocation of factory activity.

3. When input and capacity are in the ramp-up mode (when input and capacity are in the mode of increasing) digital Kanban systems do not handle the changes occurring well. During a production ramp-up, additional equipment is added to each Kanban and the WIP materials level must increase to utilize the additional capacity. Therefore, the number of tokens allocated to each Kanban must increase with additional equipment. When a given piece of equipment has multiple recipes to support several Kanbans, the problem arises that the decision on allocation of the appropriate number of tokens to each Kanban becomes difficult, if not impossible, to make. The Kanban system must handle a dynamic quantity of WIP which increases with time.

4. Determination of adequate quantity of WIP-max (maximum WIP and maximum number of tokens) requires good knowledge of the theoretical cycle time at each step. This is difficult to know because in a semiconductor manufacturing process some pieces of equipment have more than one recipe to support steps in different Kanbans. During each day, if a piece of equipment is set to run a particular recipe but not another particular recipe, the Kanban that it supports will have a higher capacity while the other Kanban will have less capacity. This multiplicity of recipes sharing a single piece of equipment makes the Kanban system less useful than is desirable for a semiconductor manufacturing process.

5. Prior art digital Kanban systems have been too rigid to handle an abnormal situation, such as an unbalance of the quantity of WIP materials due to a catastrophic equipment breakdown. Another problem occurs in an event such as when a customer decides to detain (hold) a significant portion of the WIP materials due to an unanticipated change in circumstances, e.g. the discovery of a design problem or a business decision to accept a large order using a newly developed process which is quite different from current ones. The reverse of the above types of situations creates the same problem. It is difficult to calculate the appropriate number of tokens in each Kanban as the capacity changes due to a change in the process mix. Some recipes used by one process have a much higher capacity or a much lower capacity than another recipe. In the current state of the art, no intelligent system can capture, i.e. adjust, to the changes in a manufacturing system from hour to hour to make a decision on the optimum number of tokens to be allotted for each Kanban.

SUMMARY OF THE INVENTION

In accordance with this invention, a method is provided for operating a manufacturing control system for computer control of work flow in an automatic manufacturing production line with a plurality of work stations at which work progress is monitored, by assigning priority ratings to each lot of WIP materials with the priority ratings ranging from a low priority rating to a high priority rating.

Preferably, the method includes clocking passage of WIP materials to measure depletion and accumulation of material at a work station with increases in priority rating as a function of the difference of target velocity minus actual velocity of work with an increase of 1 priority rating level as the cumulative value of the difference exceeds a predetermined percentage, whereby automation of production control of a manufacturing process is provided by improved automation of work scheduling.

Testing to determine whether highest priority lots are present in the WIP materials to determine whether to batch or stop batching mixed lots of WIP materials, stopping batching when highest priority lots are present, or batching lots when no highest priority lots are present is preferred.

Preferably PR=2 to PR=5 lots are batched when higher priority lots are absent, by the steps of testing to determine whether highest priority lots are present in the WIP materials to determine whether priority PR=1 lots appear in the current lot queue. If YES, then generate a signal to stop batching of PR=2 to PR=5; or if NO then generate a signal for batching PR2 to PR5 lots.

Another preferred step is testing to determine whether the queue time for lot is more than $T_1$ hours. If YES, then upgrade the priority rating, PR=X level by one level by sending a signal to the production line. If NO, proceed to the Wait. Then Retest function, and after the upgraded lot has been run, reset to the default priority rating PR=5.

Preferably the method includes the steps of testing to determine the queue time for a lot, the DELTA between the Expected Date Out, EDO, and the Original Commitment Date, OCD, and to provide an upgrade of the priority rating PR=X if WIP is less than the set limit.

In addition, provide one promotion for each $N_1$ days the EDO falls behind the OCD, and after the upgraded lot has been run, reset to the default priority rating PR=5.

Preferably perform the step of testing to determine the whether the cumulative moves in a Kanban are X% below target. If YES, then upgrade the priority rating, PR=X by one level, and if NO then continue to test whether the cumulative moves in a Kanban are X% below target.

In addition, test to determine the whether the cumulative moves in a Kanban are 5% below target.

Another step is to test to determine whether the value of $N_1$ equals 3 days behind.

It is preferred to provide an increase in the priority rating of a lot as a function of increasing queue time, providing an increase in the priority rating of a lot as a function of the difference comprising the expected date out minus commitment date, and resetting to a default priority rating, after the lot is run.

It is preferred to clock passage of WIP materials to measure depletion and accumulation of material at a work station with increases in priority rating as a function of the difference of target velocity minus actual velocity of work with an increase of 1 priority rating level as the cumulative value of the difference exceeds a predetermined percentage, whereby automation of production control of a manufacturing process is provided by improved automation of work scheduling.

In accordance with another aspect of this invention, a manufacturing control system provides computer control of work flow in an automatic manufacturing production line with a plurality of work stations at which the progress of work is monitored. The means provided comprise means for assigning priority ratings to each lot of WIP materials with the priority ratings ranging from a low priority rating to a high priority rating, means for providing an increase in the priority rating of a lot as a function of increasing queue time, means for providing an increase in the priority rating of a lot as a function of the difference expected date out minus commitment date, and means for resetting to a default priority rating, after the lot is run.

Preferably there are means for clocking passage of WIP materials to measure depletion and accumulation of material at a work station with increases in priority rating as a function of the difference of target velocity minus actual velocity of work with an increase of 1 priority rating level as the cumulative value of the difference exceeds a predetermined percentage, whereby automation of production control of a manufacturing process is provided by improved automation of work scheduling.

Preferably there are means for testing to determine whether highest priority lots are present in the WIP materials to determine whether to batch or stop batching mixed lots of WIP materials, means for stopping batching when highest priority lots are present, or batching lots when no highest priority lots are present.

Preferably, there are means for testing to determine whether highest priority lots are present in the WIP materials to determine whether current lot is behind by more than a maximum time, upgrading priority rating by one level when the current lot is behind by more than the maximum time, or continuing with current priority rating when the current lot is behind by less than the maximum time.

In addition there are means for batching of PR=2 to PR=5 lots when higher priority lots are absent, comprising means for performing the functions as follows: means for testing to determine whether highest priority lots are present in the WIP materials to determine whether priority PR=1 lots appear in the current lot queue. If YES, then generate a signal to stop batching of PR=2 to PR=5. If NO then generate a signal for batching PR2 to PR5 lots.

In addition, it is preferred that there means for testing to determine whether the queue time for lot is more than $T_1$ hours. If YES, then upgrade the priority rating, PR=X level by one level by sending a signal to the production line. If NO, proceed to the Wait. Then Retest function and after the upgraded lot has been run, reset to the default priority rating PR=5.

Preferably, it performs the functions as follows: means for testing to determine the queue time for a lot, the DELTA between the Expected Date Out, EDO, and the Original Commitment Date, OCD, and providing an upgrade of the priority rating PR=X if WIP is less than the set limit.

Preferably the system includes means for performing the functions of providing one promotion for each three days the EDO falls behind the OCD, and after the upgraded lot has been run, reset to the default priority rating PR=5.

In addition, preferably, there are means for testing to determine the whether the cumulative moves in a Kanban are X% below target. If YES, then upgrade the priority rating, PR=X by one level. If NO then continue to test whether the cumulative moves in a Kanban are X% below target.

In addition there may be means for performing the function of testing to determine the whether the cumulative moves in a Kanban are 5% below target.

Preferably, means are provided to make the test to determine whether the value of $N_1$ equals 3 days behind.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

This invention provides a shop-floor system for dispatching work based on computer operated voting scheme which allows work scheduling based on application of several different rules (algorithms). When these rules are applied, those lots of WIP materials which accrue more votes are awarded a higher priority and accordingly they are run through the production line earlier than are the lots with lower priority. For improved work flow efficiency, an escalation mechanism is built into the system. To implement all of these features, the system used employs an essentially fuzzy logic approach.

Fuzzy logic is the opposite of digital logic which provides a specific outcome based on a fixed set of inputs. Fuzzy logic provides results in a shade of grey instead of the black-and-white (binary: 1, 0) type result typical of digital logic. The system of the present invention uses a priority rating to determine the relative sequence of lots to be run in the factory. The system employs a number of priority levels, i.e. a predetermined number such as five (5) to start with, but the number of priority levels can be increased as system sophistication rises. The decision as to which lot to run is thus based on a weighting of all inputs, in a manner which is very similar to the reaction of a brain cell to input stimuli. When the stimuli are strong, the priority goes up and the lot has a higher priority to be processed.

Each lot awaiting semiconductor wafer fabrication is assigned a Priority Rating (PR.) The PR ratings assigned are represented by a number from PR=1 to say about PR=5, with PR=1 being the highest priority, and with PR=5 being the lowest priority rating, as well as, the starting and the default priority values. While the maximum value of PR is 5 in this example, it could be a higher or a lower number and the present invention applies to any number which is an integer above 2.

Figure 1:
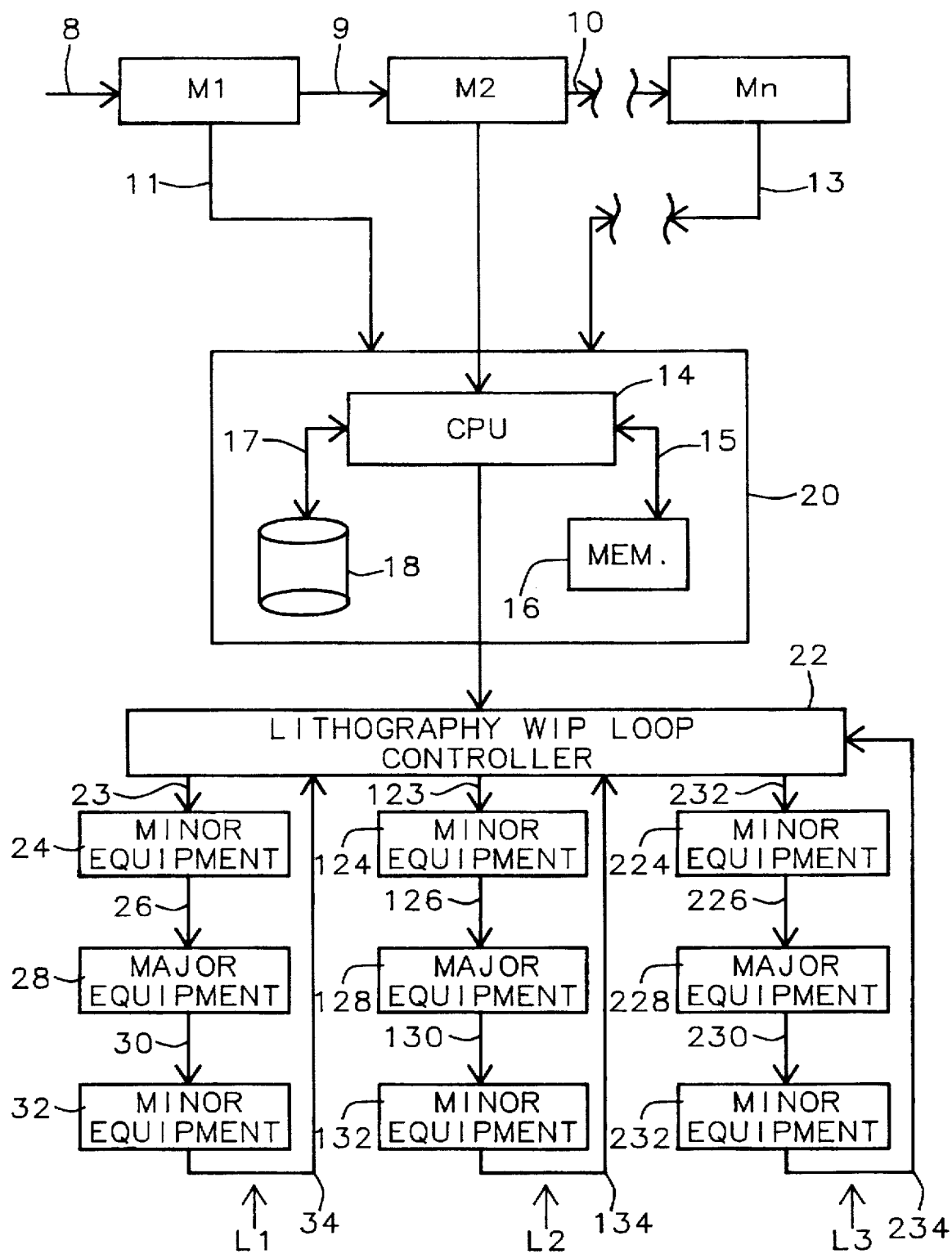
FIG. 1 shows a computer system with a central processing unit (CPU) connected to receive data on lines from monitors for operation of a manufacturing facility.

Referring to FIG. 1, a computer system 20 has a central processing unit (CPU) 14 connected to receive data on lines 11, 12 and 13 from monitors M1, M2, . . . Mn for operation of a manufacturing facility with work flowing along paths 14, 16 and 18 between the monitors M1, M2, . . . Mn. The computer system 20 serves the function of tracking lots and dispatching lots for the factory. The CPU 14 is connected via line 15 to a conventional random access memory (MEM) 16. In addition, CPU 14 is connected via line 17 to a conventional Direct Access Storage Device (DASD) 18, e.g. a disk drive, where data and the computer programs employed in the system of this invention are stored. The CPU 14 is connected via output line 21 to a lithography WIP loop processor 22, as described below.

The Priority Rating PR of each lot is upgraded or downgraded by the computer system 20 which tracks the lots by reading monitors M1, M2, . . . Mn. The computer 20 controls priority ratings PRs of machine tracking, based on a set of priority rules stored in programs in the DASD 18. The priority rating PR can be set manually, if a permanent priority rating PR=X, is desired (where X is an integer from 1 to 5.) For example a "hot" (important or high priority) lot is awarded a constant priority of PR=1.

SHOP FLOOR SCHEDULING SYSTEM

A shop floor scheduling system in accordance with this invention has a number of features as follows:

A) All lots have one of the five priorities assigned thereto. Most lots start with priority PR=5. A so-called "hot" lot, of high priority starts with or is assigned the priority PR=1.

B) Priority upgrade/downgrade is obtained by:
 a) planning which provides a semi-permanent change.
 b) computer-temporary change based on the rules as follows:
  1) Good only during the time that the condition persists.
  2) Revert to a) when condition removed.
   As used here, a "condition" refers to a locally generated condition such as:
    i) the WIP materials level is too high or too low,
    ii) an equipment is shut-down or is just being added to the line, or
    iii) a lot which has completed a process step is ready to advance to a different location and therefore requires recalculation of the priority for the lot.

C) Priority PR=1 is for a "hot" lot (or any other lot promoted to level PR=1 by the computer 20 in accordance with the rules of the system, as described elsewhere herein.)

D) Priority PR=5 is reserved for process/equipment which is shut down. WIP materials with the PR=5 rating are run only when no other, higher priority, work is waiting to be processed by the production line.

E) Lots with lower priority e.g. PR=3, PR=4, or PR=5 can be run with a higher priority e.g. PR=1 or PR=2 job in the same batch, with the same recipe or which use the same reticle in the photoresist exposure process on the lithography line.

RULE #1—QUEUE TIME

The status is upgraded based on queue time at the rate that the PR rating is reduced from PR=5 (lowest) towards PR=1 (highest) at the rate of one level (notch) per twelve (12) hours.

RULE #2—MODIFIED KANBAN RULE FOR WIP CONTROL

Due to the multiplicity of uses of a lithography tool (i.e. in the current state of the art a lithography tool is used from 15-20 times throughout a process) balancing of the line and control of WIP materials is achieved by properly selecting which lot to run. A semiconductor process flow can be segmented into numerous (15-25) loops, each started from and ending in a lithography area. The WIP materials in each loop are to be controlled at an optimum level to utilize the major equipment in the loop while not building excessive quantities of WIP materials, which increase (hurt) cycle time.

As stated above, the computer system 20 has an output line 21 which is connected to lithography WIP loop processor 22. The processor 22 supplies data to loops L1, L2 and L3. Output line 21 provides computer dispatching instructions from CPU 14 to the loop processor 22, whereby the priority rating can be refreshed by operation of computer 20, which means that the priority of each lot is upgraded or downgraded at this step based upon the data collected by the monitors M1, M2, ... Mn and the rules of the programs of this invention.

The lithography WIP processor 22 provides a central pool of data which provides data to each of the flow loops L1, L2 and L3 involving a few (1-2) minor equipment units 24, 32, 124, 132, 224, 232 as well as a few (1-2) major equipment units 28, 128, 228 interspersed with the minor units as described in more detail below.

In loop L1 the line 23 connects from lithography WIP loop controller 22 to minor equipment 24, which is connected by line 26 to major equipment 28, which is connected by line 30 to minor equipment 32. In turn from minor equipment 32, the loop continues on line 34 back to the loop controller 22.

In loop L2 the line 123 connects from loop controller 22 to minor equipment 124, which is connected by line 126 to major equipment 128, which is connected by line 130 to minor equipment 132. In turn from minor equipment 132, the loop continues on line 134 back to the loop controller 22.

In loop L3 the line 223 connects from loop controller 22 to minor equipment 224, which is connected by line 226 to major equipment 228, which is connected by line 230 to minor equipment 232. In turn from minor equipment 232, the loop continues on line 234 back to the loop controller 22.

Each of the loops L1, L2 and L3 in FIG. 1 can be viewed as a Kanban (segment) in a Kanban token system. A look-up table on the maximum and minimum WIP materials level of each of the loops L1, L2, and L3 is set up in the dispatching computer system 20. The WIP materials within a given one of the loops L1, L2, and L3 is added up by the dispatching computer system 20 on a fixed time interval, say one hour, and is made to be compared with the look-up table. When the quantity of WIP materials exceeds the set limit, each of the lots of the lithography WIP materials waiting to be run to feed the given loop is downgraded or upgraded in priority by one notch.

The computer system 20 provides a status upgrade when the downstream quantity of WIP material is below the lower limit which has been set.

The status is set to PR=5 when the process is shut down and when the quantity of WIP materials exceeds a predetermined high limit which has been set.

The system sets a high limit on WIP materials, as follows:

WIP level=Raw throughput (Qr)×MTTR

The system also sets a low limit, as follows:

$$WIP\ level = 2 \times Qr \times \left[ \frac{\text{theoretical cycle time of running}}{\text{running 1 lot through lithography}} \right]$$

Figure 2:
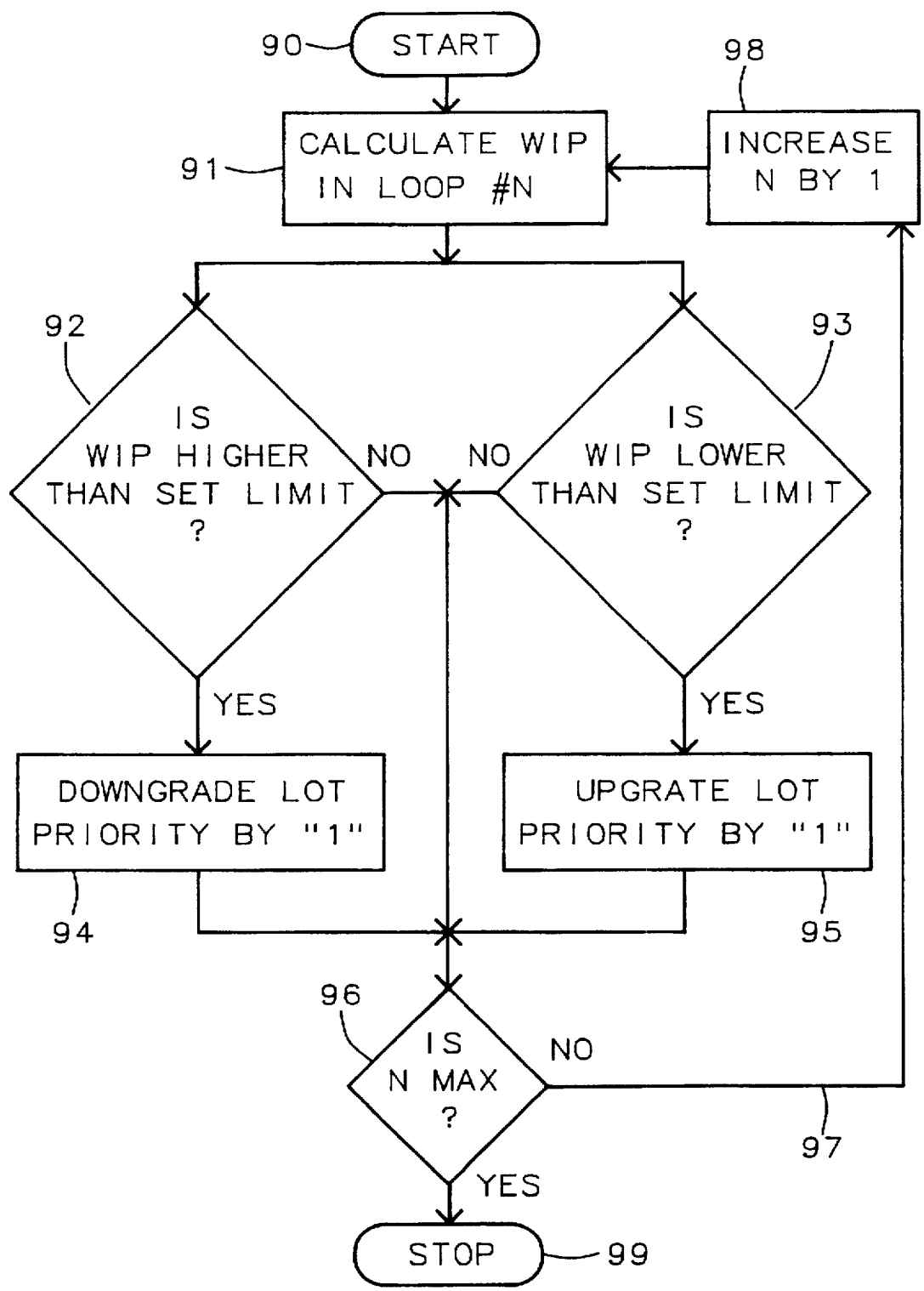
FIG. 2 shows a flow chart of a program stored in a DASD (Direct Access Storage Device) in a computer, which provides for downgrading and upgrading the level of a lot under consideration.

FIG. 2 shows a flow chart of a program stored in DASD 18 in computer 20, which provides for downgrading and upgrading the level of a lot under consideration. The process starts at step 90 leading to step 91 in which the quantity of WIP in a given loop #N is calculated.

Next, in decision block steps 92 and 93 a pair of decisions are made as to whether the quantity of WIP is higher or lower than a set limit.

In decision block step 92 the decision made is "Is WIP Higher than Set Limit". If the result of the decision in step 92 is YES that the WIP is higher than a set limit, then proceed to step 94.

In step 94, the step of "Downgrade lot priority by '1'" is performed. After step 94, the program proceeds to step 96.

If the result of the decision in step 92 is NO, then proceed to decision block step 96.

Simultaneously with step 92, in decision block step 93, a decision is made "Is WIP Lower than Set Limit" as to whether the quantity of WIP is lower than a set limit. If YES, then proceed to step 95.

In step 95, the program upgrades the lot priority by "1" unit. After step 95, the program proceeds to step 96. If the result of the decision in step 93 is NO, then proceed to step 96.

If the result of the decision in step 93 is NO, then proceed to step 96.

In "Is N MAX" decision block step 96, a test is made to determine whether all of the N loops have been tested as to whether WIP is outside the set limits.

If YES, then the program goes to step 99. If, NO, the process continues as indicated by via line 97 to step 98. In step 98, the program increased the value of N by one towards the maximum value of N.

The process of steps 91-95 until the value of the loop number N is the maximum value, i.e. all of the N loops have been processed. If the result of the test in step 96 is NO, then the program branches back to the "Increase N by 1" step 98 which starts step 91 once again to test the new Loop #N just selected in step 98.

After the NO result of the test in step 96, when the decision has been made that N is the maximum value, the program proceeds to stop the routine in step 99.

RULE #3—WIP BALANCE CONTROL BY LITHOGRAPHY LINE?

Figure 3:
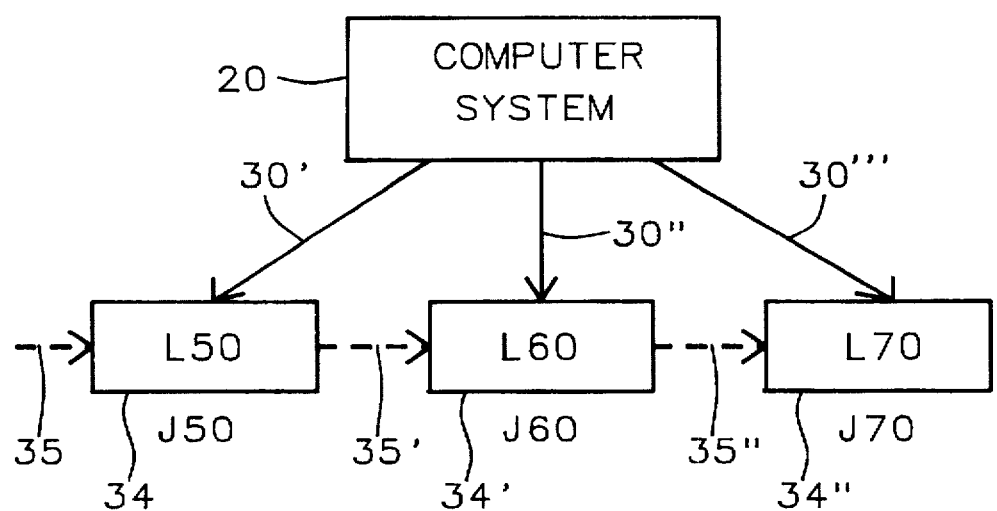
FIG. 3 shows the computer system 20 is connected via output lines to a set of lot flow loops with lots travelling along individual paths to loops.

Referring to FIG. 3, the computer system 20 is connected via output lines 30', 30" and 30'" to a set of lot flow loops L50, L60 and L70 with lots travelling along individual paths, i.e. path 35 to loop L50, path 35' to loop L60, and path 35" to loop L70.

The run rate of the lot flow loops L50, L60, and L70 is targeted at the average of the values of the upstream run rate J50 of loop L50 and the value of the downstream run rate J70 of loop L70, as follows:

J60=50%*(J50%*J70).

For example, the run rate is calculated per twelve (12) hour shift.

The lots get upgraded/downgraded when the run-rate falls below or exceeds target by 20%.

RULE #4

Expected Date Out (EDO) vs. Originally Scheduled Date (OSD)

While the OSD is the Originally Scheduled Date, it also represents the date for which a commitment has been made to make a delivery to the customers.

The EDO of each lot is calculated based on the following formula:

$$EDO = \frac{\text{Start Date} + \text{Elapsed Days} * (\text{\# of steps completed})}{(\text{Total \# of steps required to complete lot})}$$

Therefore EDO is an estimated date of completion based on the percentage (%) of the steps completed and the amount of time consumed.

The DELTA is defined by the equation as follows:

DELTA=*EDO*–*OSD*

When the value of DELTA is positive, the lot X is expected to be completed later than the date of commitment and thus in the absence of any adjustment, the lot X would be behind schedule. Then a priority upgrade is given to the lot X. When DELTA is a negative number, the lot Y is ahead of schedule. If DELTA is more negative than –7, the lot priority is changed to 5 which means that the lot is processed when time is available.

There is a status upgrade for each three (3) days in the value of DELTA.

There is a status downgrade to PR=5 when OSD exceeds EDO by seven (7) days.

RULE #5 QUEUE TIME RULE FOR CYCLE TIME REDUCTION

Cycle Time Reduction

Figure 4A:
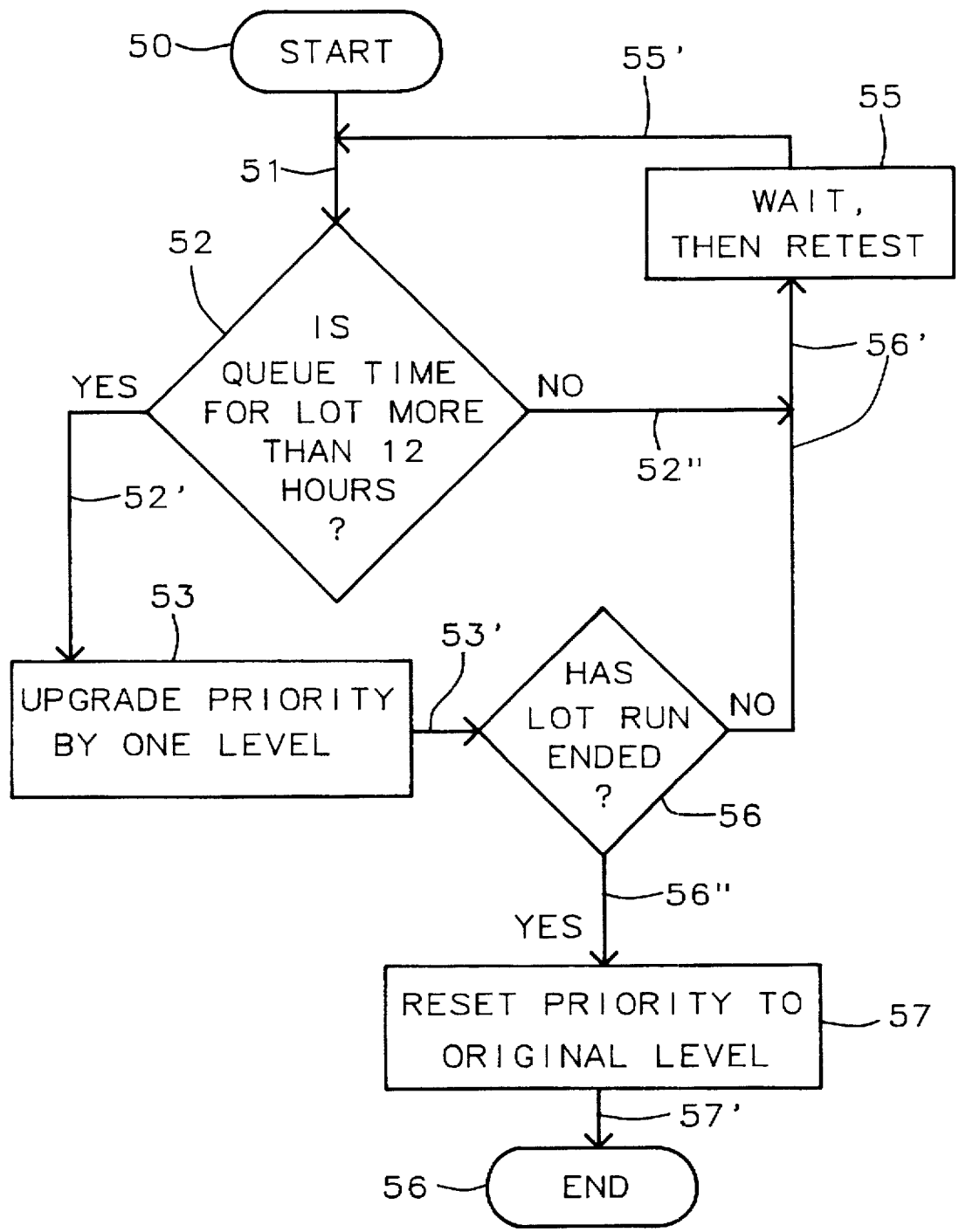
FIG. 4A shows a flow chart of another algorithm stored in the DASD of computer system in FIG. 1.

In FIG. 4A another algorithm (stored in DASD 18 of computer system 20 in FIG. 1) starts at step 50, and the line 51 leads to the next step indicated by decision block 52. The decision block 52 operates upon data from the monitors M1, M2, . . . Mn to determine the answer to the question as follows:

"Is Queue Time For Lot More Than 12 Hours?"
If YES, (i.e. the decision block 52 determines that the answer is YES,) then the computer 10 sends a signal via line 52' to "Upgrade Priority by one Level" block 53 to upgrade the level of the priority rating (PR=X) by one level by sending a signal to the production line.

Then the algorithm continues with an output from block 53 on line 53' to "Has Lot Run Ended?" decision block 56.

If YES, then the output on line 56" goes to Reset Priority to Original Level" block 57 which resets the PR level to PR=5. Then the output passes from block 57 on line 57' to the END block 56 to end the algorithm.

If the output of decision block 56 is NO, it passes on line 56' to the "Wait, Then Retest" block 55 which recycles via line 55' and line 51 to decision block 52.

If the decision from the decision block 52 is NO, (for a determinations that the queue time for the lot is more than $T_1$ hours, e.g. 12 hours) then an output is generated on line 52" which goes to line 56' to the input of the "Wait, Then Retest" block 55, as described above.

The rules to upgrade or downgrade lot priority are based on business objectives. Typical rules are as follows:

Cycle Time Reduction: Queue Time Rule

Priority upgrades are provided based on queue time. For example: one promotion is allowed within each 12 hour period, followed by resetting to the default priority rating PR=5 after the upgraded lot has been run.

DELIVERY COMMITMENT: DELTA TO COMMIT DATE RULE

Each lot has an Expected Date out (EDO). An upgrade of the priority rating PR=X is based on the DELTA between EDO and the Original Commitment Date (OCD.) For example, there is one (1) promotion for each three (3) days the EDO falls behind the OCD.

Figure 4B:
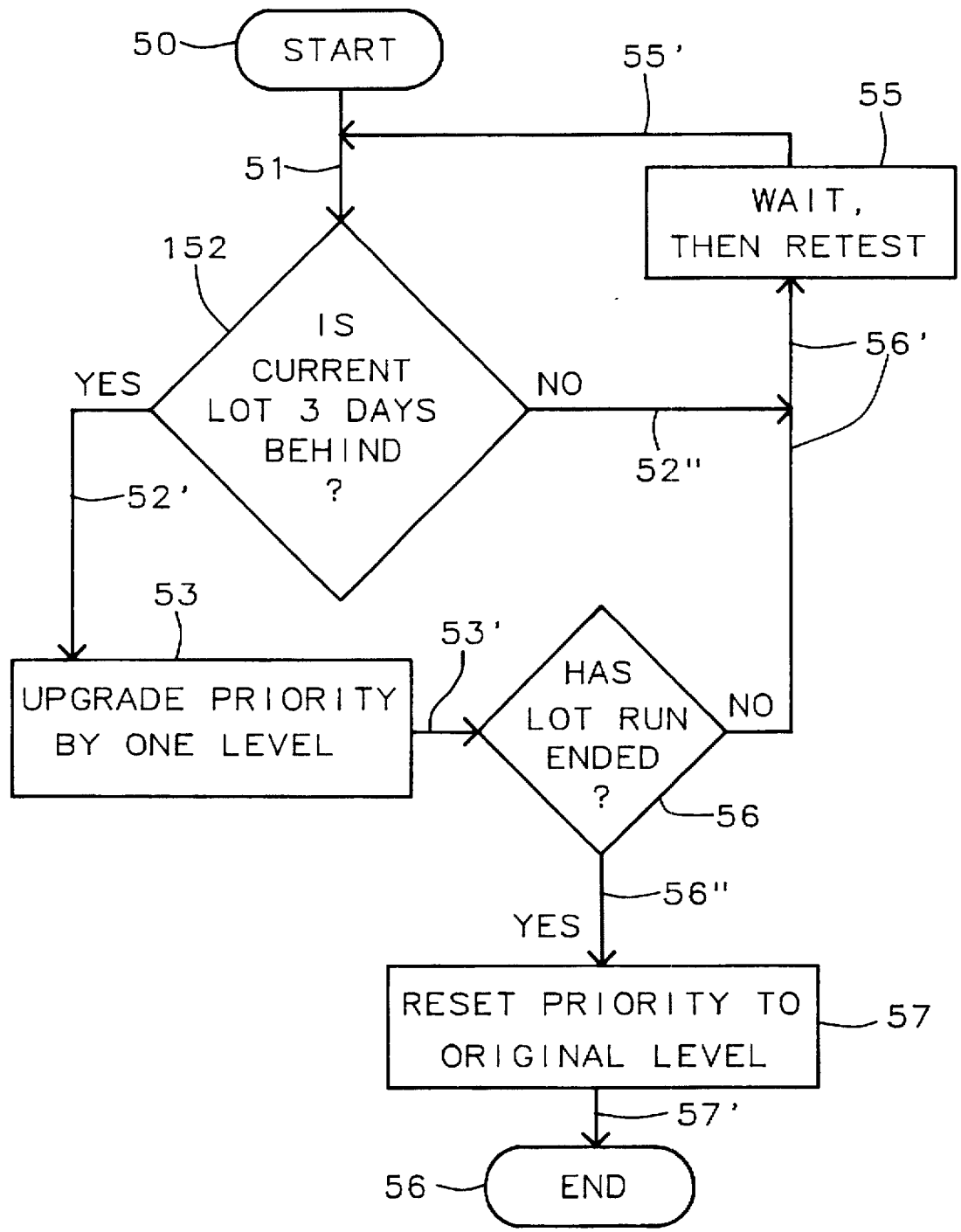
FIG. 4B shows an algorithm stored in the DASD which is an implementation of a rule known as the Delivery Commitment rule.

FIG. 4B shows an algorithm stored in DASD 18 which is an implementation of the Delivery Commitment rule with a modification of the algorithm of FIG. 4A with the first decision block 152 being "Is Current Lot 3 Days Behind?", which checks to see if the lot currently being considered in a Kanban is at least 3 days behind schedule. If YES, the block 53 follows as in FIG. 4A to upgrade the level of the priority rating (PR=X) by one level by sending a signal to the production line. If NO, the line 52" leads to block 55 as in FIG. 4A. Otherwise the flow chart is identical to FIG. 4A as is the algorithm and the description thereof, so repetition of the description is unnecessary.

Workcenter Rule: Batching and Disbatching Rule

In addition to the built-in priority setting, a rule is used at each workstation to batch similar lots to be run at the same time in order to reduce the number of recipe changes and thus to improve the rate of equipment utilization. (Frequent recipe changes reduce the equipment utilization rate due to time required to set up each new recipe). For each workstation when there is an instruction from a specialist to select lots to run, the computer checks the WIP materials and automatically identifies the largest batch with the highest priority lot to be run by the worker.

Figure 5:
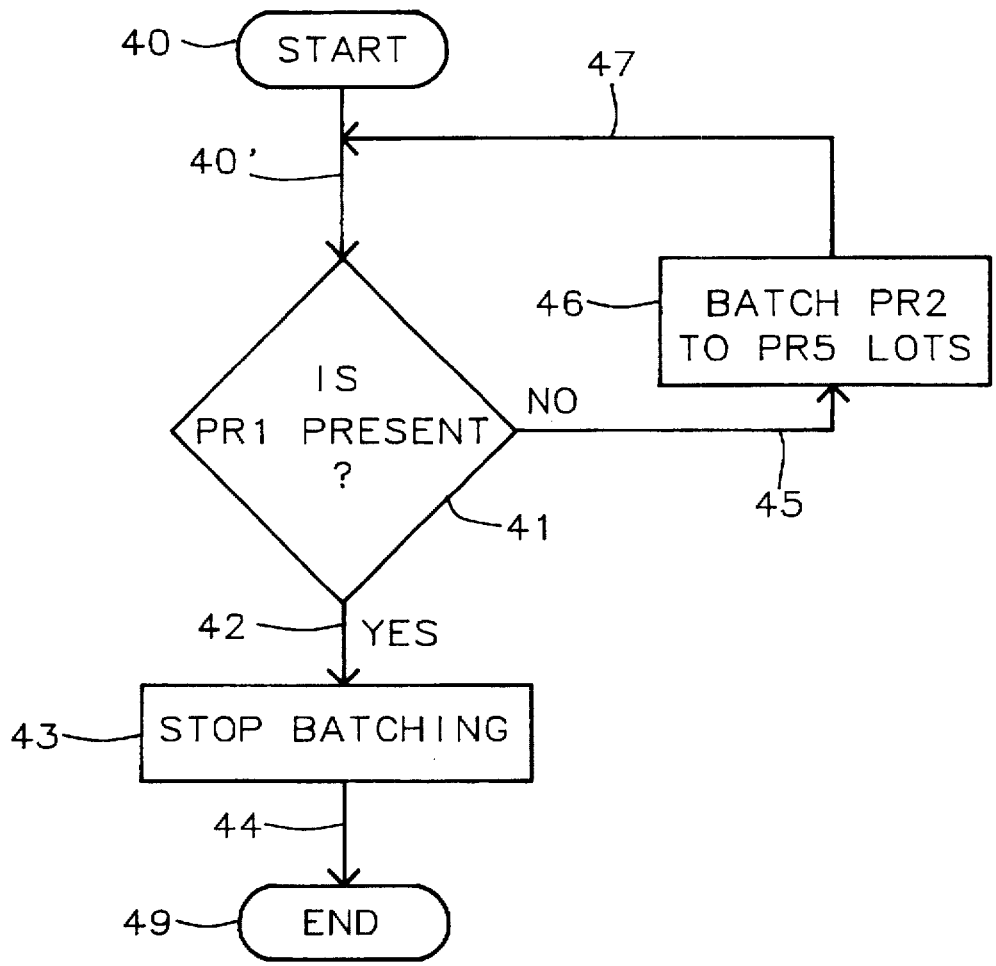
FIG. 5 shows a flow chart of an algorithm for batching stored in the DASD.

Referring to FIG. 5, which is a flow chart of an algorithm for batching stored in DASD 18, the decision on which lot to run at a particular work station is based on a previously assigned PR (priority rating) plus some batching rules such as running the lots of WIP materials with lower PR (priority rating) values along with a higher priority lot to reduce setup time and to increase equipment utilization by batching.

Batching can be used for PR=3 to PR=5 lots, but only if NO priority PR=1 and PR=2 lots appear in the queue. In that case, the algorithm shown in FIG. 5 provides for batching of lower priority lots from PR=2 to PR=5 starting at step 40, and line 40' leads to "Is PR1 Present" decision block 41 where the computer system 10 in FIG. 1 operates in decision block 41 upon data from the monitors M1, M2, . . . Mn to determine whether any lots of WIP materials are present on the production line which have PR values of PR=1 (PR1). If decision block 41 determines that the answer is YES, then the computer system 20 sends a signal on line 42 to block 43 to stop the batching process. The step 43 leads via line 44 to step 49 which ends the batching routine of FIG. 5.

If the decision block 41 determines that there are no PR1 lots present, then the answer from decision block 41 is NO and the output on line 45 goes to block 46 to generate signals calling for batching the lots from PR2 to PR5. At the end of the block 46 operation, the output line 47 sends a signal on line 40' to decision block 41, which repeats the functions as described above.

WIP Materials Balancing: Modified Kanban Rule

Each process is a combination of various segments (Kanbans) starting or ending at masking steps. Therefore, for each masking step and each wafer start there is a Kanban gate where activities are clocked. These activities (moves) are indicators of depletion or accumulation of material within the Kanban. The priority upgrade is based on the DELTA between actual and target moves. There is one (1) promotion of all lots within the Kanban when cumulative moves fall below the target by 5%.

Bottleneck Equipment Utilization: Segment Capacity Rule

Each segment (Kanban) may or may not contain one bottle-neck equipment, which typically has high cost and uncertain performance based on MTTF (Mean Time To Failure) and MTTR (Mean Time To Repair).

When this equipment is down (in a condition of Failure), the lots from a previous step will be downgraded to avoid WIP materials buildup. In a normal case, WIP materials staging is necessary to ensure the continuous loading of this equipment. When the WIP materials between a Kanban gate and such equipment is below a set point which is equal to the throughput of equipment multiplied by MTTF, lots at the previous Kanban gate get a priority promotion.

MODIFIED KANBAN SHOPFLOOR DISPATCHING SYSTEM

Each Kanban gate has a move target. Failing to meet the target indicates a low quantity of WIP materials, or equipment bottleneck within the Kanban. The move target is set by Fab manager based on desirable output. When moves are below the target, all lots within the Kanban receive a higher priority PR=X.

Figure 6:
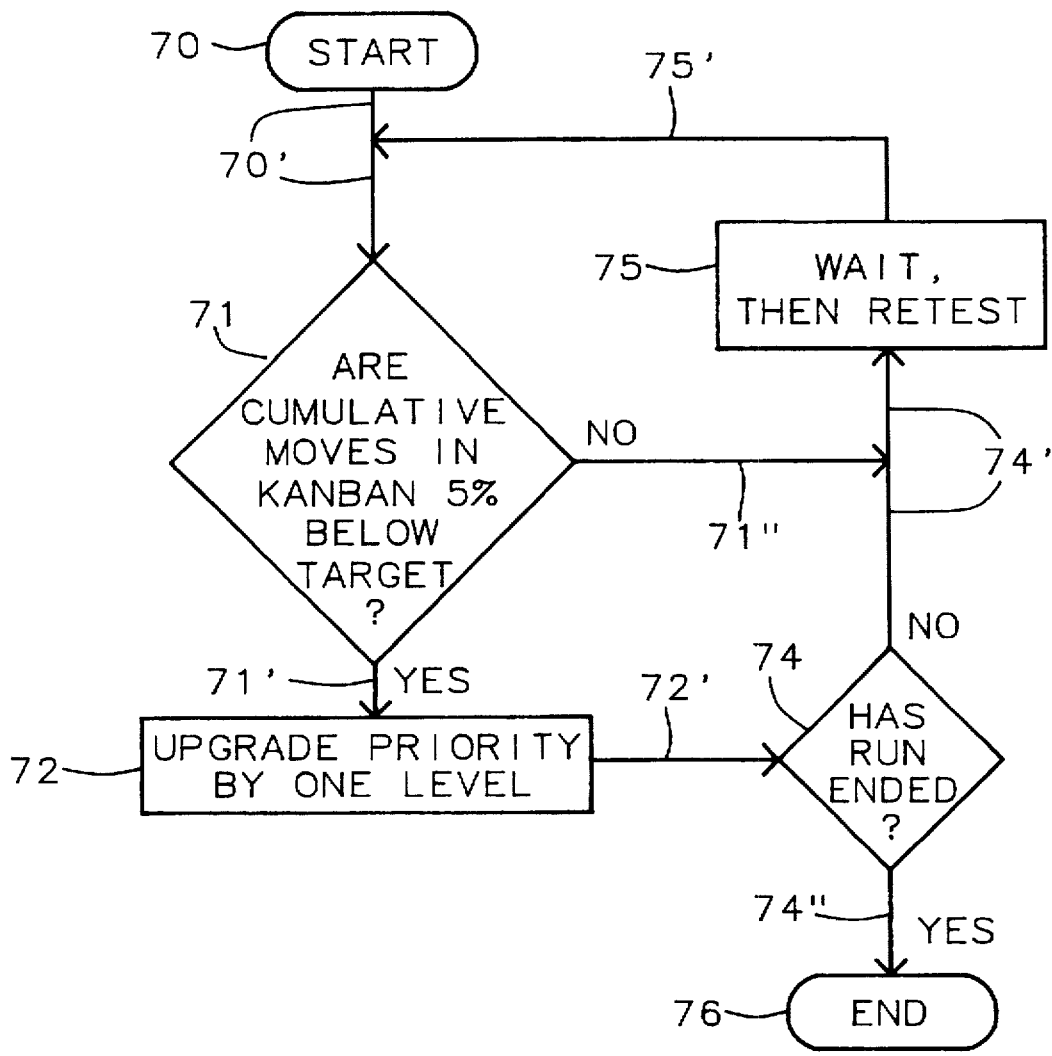
FIG. 6 shows a flow chart for a program stored in the DASD to detect and to deal with cases in which the cumulative moves in the Kanban are 5% below the target.

FIG. 6 shows a flow chart for a program stored in DASD 18 to detect and to deal with cases in which the cumulative moves in the Kanban are 5% below the target.

The program starts in step 70 and proceeds along line to decision block 71 which tests "Are cumulative moves in the Kanban 5% below target?".

If test 71 determines that the answer is NO, then the computer system 20 sends a signal on line 71" to block 75 to wait and then retest by sending a signal on lines 75' and 70' to initiate the test 71.

If test 71 determines that the answer is YES, then the computer system 20 sends a signal on line 71' to block 72 to upgrade the priority by one level. The step 72 leads via line 72' to test 74.

In test 74, the "Has Run Ended?" decision block determines whether the lot run has ended. If the decision block test 41 determines that the run has ended, then the result is YES and the computer sends a signal as indicated by line 74" to end the routine in step 76.

If the decision block 74 finds that the answer is NO, then a signal on line 74' goes to block 75 as described above. The program of FIG. 6 continues until the run has ended.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Having thus described the invention, what is claimed as new and desirable to be secured by Letters Patent is as follows:

1. A method of operating a manufacturing control system for computer control of work flow in an automatic manufacturing production line with a plurality of work stations at which the progress of work is monitored, by the steps comprising, assigning priority ratings (PR) to each lot of WIP materials with said priority ratings (PR) ranging from a low priority rating to a high priority rating.

making fuzzy logic tests of parameters of lots of WIP materials and making adjustments based upon said tests as follows:

a) measuring the velocity of work flow parameter and adjusting PR rating as a function of said velocity, b) testing whether a lot exceeds a maximum time and increasing the PR rating if the lot exceeds said maximum time, c) batching when higher priority lots are absent, then upgrading the priority rating (PR) of said lot, and d) testing whether a Kanban is below target and if so, then upgrading the PR rating.

2. A method in accordance with claim 1 comprising:

clocking passage of WIP materials to measure depletion and accumulation of material at a work station with increases in priority rating as a function of the difference of target velocity minus actual velocity of work with an increase of 1 priority rating (PR) level as the cumulative value of said difference exceeds a predetermined percentage, whereby automation of production control of a manufacturing process is provided by improved automation of work scheduling.

3. A method in accordance with claim 1 comprising:

testing to determine whether highest priority lots are present in the WIP materials to determine whether to batch or stop batching mixed lots of WIP materials, and stopping batching when highest priority lots are present, or batching lots when no highest priority lots are present.

4. A method in accordance with claim 1 comprising:

testing to determine whether highest priority lots are present in the WIP materials to determine whether a current lot is behind by more than a maximum time, upgrading priority rating by one level when said current lot is behind by more than said maximum time, or continuing with current priority rating when said current lot is behind by less than said maximum time.

5. A method in accordance with claim 1 for batching of PR=2 to PR=5 lots when higher priority lots are absent, comprising the steps as follows:

testing to determine whether highest priority lots are present in the WIP materials to determine whether priority PR=1 lots appear in the current lot queue, If YES, then generating a signal to stop batching of PR=2 to PR=5, or If NO then generating a signal for batching PR2 to PR5 lots.

6. A method in accordance with claim 1 comprising the steps as follows:

test to determine whether the queue time for lot is more than $T_1$ hours,

If YES, then upgrade the priority rating, PR=X level by one level by sending a signal to the production line.

If NO, proceed to the wait, then retest function, and after the upgraded lot has been run, reset to the default priority rating PR=5.

7. A method in accordance with claim 6 comprising the steps as follows:

testing to determine the queue time for a lot, the DELTA between the Expected Date Out (EDO) and the Original Commitment Date (OCD), and providing an upgrade of the priority rating PR=X if WIP is less than the set limit.

8. A method in accordance with claim 7 comprising the steps as follows:

providing one promotion for each $N_1$ days the EDO falls behind the OCD, and after the upgraded lot has been run, resetting to the default priority rating PR=5.

9. A method in accordance with claim 8 comprising the step as follows:

wherein said test is made to determine whether the value of $N_1$ equals 3 days behind.

10. A method in accordance with claim 1 comprising the steps as follows:

test to determine whether the cumulative moves in a Kanban are X% below target,

If YES, then upgrade the priority rating, PR=X by one level, and

If NO then continue to test whether the cumulative moves in a Kanban are X% below target.

11. A method in accordance with claim 10 comprising the step as follows:

wherein said test is made to determine whether the cumulative moves in a Kanban are 5% below target.

12. A method in accordance with claim 1 comprising:

providing an increase in the priority rating of a lot as a function of increasing queue time, providing an increase in the priority rating of a lot as a function of the difference comprising the expected date out minus commitment date, and resetting to a default priority rating, after the lot is run.

13. A method in accordance with claim 12 comprising:

clocking passage of WIP materials to measure depletion and accumulation of material at a work station with increases in priority rating as a function of the difference of target velocity minus actual velocity of work with an increase of 1 priority rating level as the cumulative value of said difference exceeds a predetermined percentage, whereby automation of production control of a manufacturing process is provided by improved automation of work scheduling.

14. A method in accordance with claim 12 comprising:

testing to determine whether highest priority lots are present in the WIP materials to determine whether to batch or stop batching mixed lots of WIP materials, stopping batching when highest priority lots are present, or batching lots when no highest priority lots are present.

15. A method in accordance with claim 12 comprising:

testing to determine whether highest priority lots are present in the WIP materials to determine whether the current lot is behind by more than a maximum time, upgrading priority rating by one level when said current lot is behind by more than said maximum time, or continuing with current priority rating when said current lot is behind by less than said maximum time.

16. A method in accordance with claim 12 for batching of PR=2 to PR=5 lots when higher priority lots are absent, comprising the steps as follows:

test to determine whether highest priority lots are present in the WIP materials to determine whether priority PR=1 lots appear in the current lot queue, and If YES, then generate a signal to stop batching of PR=2 to PR=5, or If NO then generate a signal for batching PR2 to PR5 lots.

17. A method in accordance with claim 12 comprising the steps as follows:

test to determine whether the queue time for lot is more than $T_1$ hours, and

If YES, then upgrade the priority rating, PR=X level by one level by sending a signal to the production line, If NO, proceed to the wait, then retest function, and after the upgraded lot has been run, reset to the default priority rating PR=5.

18. A method in accordance with claim 17 comprising the steps as follows:

wherein said test is made to determine whether the cumulative moves in a Kanban are 5% below target.

19. A method in accordance with claim 12 for batching of PR=2 to PR=5 lots when higher priority lots are absent, comprising the steps as follows:

test to determine whether highest priority lots are present in the WIP materials to determine whether priority PR=1 lots appear in the current lot queue, If YES, then generate a signal to stop batching of PR=2 to PR=5, or If NO then generate a signal for batching PR2 to PR5 lots, test to determine the queue time for a lot, the DELTA between the Expected Date Out (EDO) and the Original Commitment Date (OCD) and providing an upgrade of the priority rating PR=X if WIP is less than the set limit.

20. A method in accordance with claim 12 comprising the steps as follows:

test to determine whether the queue time for lot is more than $T_1$ hours,

If YES, then upgrade the priority rating, PR=X level by one level by sending a signal to the production line, If NO, proceed to the wait, then retest function and after the upgraded lot has been run, reset to the default priority rating PR=5, providing one promotion for each $N_1$ days the EDO falls behind the OCD, and after the upgraded lot has been run, reset to the default priority rating PR=5.

21. A method in accordance with claim 12 comprising the steps as follows:

test to determine whether the cumulative moves in a Kanban are X% below target,

If YES, then upgrade the priority rating, PR=X by one level, and

If NO then continue to test whether the cumulative moves in a Kanban are X% below target.

22. A method in accordance with claim 12 comprising the steps as follows:

test to determine whether the queue time for lot is more than $T_1$ hours,

If YES, then upgrade the priority rating, PR=X level by one level by sending a signal to the production line, If NO, proceed to the wait, then retest function and after the upgraded lot has been run, reset to the default priority rating PR=5, providing one promotion for each $N_1$ days the EDO falls behind the OCD, after the upgraded lot has been run, reset to the default priority rating PR=5, and said test is made to determine whether the value of $N_1$ equals 3 days behind.

23. A manufacturing control system providing computer control of work flow in an automatic manufacturing production line with a plurality of work stations at which the progress of work is monitored, by the means comprising:

means for assigning priority ratings to each lot of WIP materials with said priority ratings ranging from a low priority rating to a high priority rating, means for providing an increase in the priority rating of a lot as a function of increasing queue time, means for providing an increase in the priority rating of a lot as a function of the difference expected date out minus commitment date, and means for resetting to a default priority rating, after the lot is run.

24. A system in accordance with claim 23 comprising:

means for clocking passage of WIP materials to measure depletion and accumulation of material at a work station with increases in priority rating as a function of the difference of target velocity minus actual velocity of work with an increase of 1 priority rating level as the cumulative value of said difference exceeds a predetermined percentage, whereby automation of production control of a manufacturing process is provided by improved automation of work scheduling.

25. A system in accordance with claim 23 comprising:

means for testing to determine whether highest priority lots are present in the WIP materials to determine whether to batch or stop batching mixed lots of WIP materials, means for stopping batching when highest priority lots are present, or batching lots when no highest priority lots are present.

26. A system in accordance with claim 23 comprising:

means for testing to determine whether highest priority lots are present in the WIP materials to determine whether current lot is behind by more than a maximum time, upgrading priority rating by one level when said current lot is behind by more than said maximum time, or continuing with current priority rating when said current lot is behind by less than said maximum time.

27. A system in accordance with claim 23 for batching of PR=2 to PR=5 lots when higher priority lots are absent, comprising means for performing the functions as follows:

means for testing to determine whether highest priority lots are present in the WIP materials to determine whether priority PR=1 lots appear in the current lot queue, If YES, then generate a signal to stop batching of PR=2 to PR=5, or If NO, then generate a signal for batching PR2 to PR5 lots.

28. A system in accordance with claim 27 comprising means for performing the functions as follows:

means for testing to determine the queue time for a lot, the DELTA between the Expected Date Out (EDO) and the Original Commitment Date (OCD) and providing an upgrade of the priority rating PR=X if WIP is less than the set limit.

29. A system in accordance with claim 27 comprising means for performing the functions as follows:

providing one promotion for each three days that the EDO falls behind the OCD, and after the upgraded lot has been run, reset to the default priority rating PR=5.

30. A system in accordance with claim 29 comprising means for performing the function as follows:

wherein said test is made to determine whether the value of $N_1$ equals 3 days behind.

31. A system in accordance with claim 23 comprising means for performing the functions as follows:

means for testing to determine whether the queue time for a lot is more than $T_1$ hours, If YES, then upgrade the priority rating, PR=X level by one level by sending a signal to the production line, If NO, proceed to the wait, then retest function, and after the upgraded lot has been run, reset to the default priority rating PR=5.

32. A system in accordance with claim 23 comprising means for performing the functions as follows:

means for testing to determine whether the cumulative moves in a Kanban are X% be low target, If YES, then upgrade the priority rating, PR=X by one level, or If NO, then continue to test whether the cumulative moves in a Kanban are X% below target.

33. A system in accordance with claim 32 comprising means for performing the functions as follows:

wherein said test is made to determine whether the cumulative moves in a Kanban are 5% below target.

* * * * *